(12) United States Patent
Goossens et al.

(10) Patent No.: US 11,679,631 B2
(45) Date of Patent: Jun. 20, 2023

(54) NOISE REDUCING TYRE

(71) Applicant: APOLLO TYRES GLOBAL R&D B.V., Enschede (NL)

(72) Inventors: Martin Goossens, Enschede (NL); Ysbrand Hans Wijnant, Enschede (NL); Bharatkumar Makwana, Enschede (NL)

(73) Assignee: APOLLO TYRES GLOBAL R&D B.V, Enschede (NL)

( * ) Notice: Subject to any disclaimer, the term of this patent is extended or adjusted under 35 U.S.C. 154(b) by 107 days.

(21) Appl. No.: 16/957,929

(22) PCT Filed: Dec. 19, 2018

(86) PCT No.: PCT/EP2018/085947
§ 371 (c)(1),
(2) Date: Jun. 25, 2020

(87) PCT Pub. No.: WO2019/129584
PCT Pub. Date: Jul. 4, 2019

(65) Prior Publication Data
US 2020/0331306 A1   Oct. 22, 2020

(30) Foreign Application Priority Data
Dec. 27, 2017  (GB) .................................... 1721970

(51) Int. Cl.
*B60C 19/00* (2006.01)
*B60B 21/12* (2006.01)

(52) U.S. Cl.
CPC ............ *B60C 19/002* (2013.01); *B60B 21/12* (2013.01)

(58) Field of Classification Search
CPC ....... B60C 19/002; B60B 21/12; B60B 21/00; B60B 2900/133; B29D 30/0061; B29D 2030/0072
See application file for complete search history.

(56) References Cited

U.S. PATENT DOCUMENTS 4,392,522 A    7/1983  Bschorr
2007/0089824 A1*  4/2007  Yukawa ................ B60C 19/002
                                                  152/450

(Continued)

FOREIGN PATENT DOCUMENTS

DE         10220193 A1   11/2003
DE      102015117856 A1    5/2016

(Continued)

OTHER PUBLICATIONS

Miyagawa, English Machine Translation of JP 2004082947, 2004 (Year: 2004).*

(Continued)

*Primary Examiner* — Robert C Dye
*Assistant Examiner* — Brendon Charles Darby
(74) *Attorney, Agent, or Firm* — Renner, Otto, Boisselle & Sklar, LLP

(57) ABSTRACT

A pneumatic tyre comprising an inner surface of the tyre, wherein a sound absorbing device component is connected to the inner surface of the tyre. The sound absorbing device component comprises a panel with a plurality of perforations and two sidewall sections, the sidewall sections being distinct from the panel, wherein the sidewall sections are connected to the inner surface of the tyre and arranged opposite of each other and wherein the panel is borne by the sidewall sections, thereby positioning the panel at a distance from the inner surface of the tyre and defining an inner volume enclosed by the panel, the sidewall sections and the inner surface. Furthermore, ≥95 area-% of all perforations (Continued)

which permit access to the inner volume are located on the panel.

13 Claims, 5 Drawing Sheets

(56) References Cited

U.S. PATENT DOCUMENTS

| | | | |
|---|---|---|---|
| 2008/0099117 A1* | 5/2008 | Tanno | B60C 19/002 |
| | | | 152/454 |
| 2008/0116612 A1 | 5/2008 | Dautrey | |
| 2015/0048669 A1 | 2/2015 | Zhu et al. | |
| 2016/0137010 A1 | 5/2016 | Sakakibara | |

FOREIGN PATENT DOCUMENTS

| | | | |
|---|---|---|---|
| EP | 0663306 | A2 | 1/1995 |
| EP | 3192670 | A1 | 7/2017 |
| JP | 2004082947 | A | 3/2004 |
| JP | 2004168212 | A | 6/2004 |
| WO | 2010149364 | A1 | 12/2010 |
| WO | 2016051371 | A1 | 4/2016 |
| WO | 2016113013 | A1 | 7/2016 |
| WO | 2017076531 | A1 | 5/2017 |
| WO | 2017163219 | A1 | 9/2017 |

OTHER PUBLICATIONS

International Preliminary Report on Patentability for International Application No. PCT/EP2018/085947 dated Jun. 30, 2020.
International Search Report and Written Opinion for International Application PCT/EP2018/085947 dated Apr. 23, 2019.

* cited by examiner

NOISE REDUCING TYRE

This application is a national phase of International Application No. PCT/EP2018/085947 filed Dec. 19, 2018 and published in the English language, which claims priority to British Application No. GB 1721970.0 filed Dec. 27, 2017, both of which are hereby incorporated herein by reference.

The present invention relates to a device which is suitable for reducing noise emission from a wheel or a tyre. The invention also relates to a tire and a rim comprising one or more of such devices.

Tyres can be optimized on several properties. With the introduction of the European tyre label, three important features are especially considered. One important feature with respect to the environment is the rolling resistance. The lower the rolling resistance of a tyre, the less fuel is needed. As the tread is in direct contact with the road, the tread has the highest influence on the overall rolling resistance of the tyre. Rolling resistance can both be related to the tread material properties as well as the tread pattern. In principle, a tread material with a low tangent delta (tan δ) at 70° C. has a lower rolling resistance.

The car should also be able to brake quickly in several weather conditions. The wet grip properties can be tuned by the tread pattern as well as the material properties of the tread. In principle, a tread material with a high tan δ at 0° C. has better wet grip properties. However, optimizing for wet grip normally results in a trade-off on the rolling resistance properties The third property mentioned on the European tyre label is noise emission.

Noise emission originates from the tyre-road interaction, which results in vibrations. In general, there are two causes of vibrations, structural excitation sources and acoustical cavity modes.

The vibrations caused by acoustical cavity modes inside the tyre are guided through the rim towards the spindle of the car body, resulting in structure borne interior noise and vibrations.

The contact of the tyre with the road causes wave excitations inside the tyre-rim cavity, known as cavity noise: during the rolling of the tyre on the road, the air present in the inner annular cavity is placed under vibration, since it is cyclically compressed in the tread flattening phase, giving rise to sound waves that are amplified via resonance. The cavity noise is then propagated to the driver/passenger compartment of the vehicle and is perceived by the passengers as being very annoying. These acoustical waves travel in both positive and negative circumferential direction and are called the forward and backward travelling wave, respectively. A standing wave pattern is formed when the wavelength exactly matches the cavity circumference. This is the so-called first acoustical cavity resonance mode and lies between 180 and 250 Hz for a passenger car tyre, dependent on both the tyre size as well as the tyre rotational speed.

In order to increase the comfort of the driver and passengers, it is important to reduce the noise of vehicles.

The prior art describes several ways to reduce the noise emission from the tyre by adding noise-absorbing foam to the internal cavity of the tyre to reduce the noise in a large frequency range. However, the first acoustical cavity resonance mode is not specifically addressed by this solution.

For example, WO 2017/163219 relates to soundproof self-sealing tyres for vehicles wheels and to processes for the manufacture thereof. In particular, the soundproof self-sealing tyres of the invention comprise closed-cell foamed polyolefin materials, preferably with closed macrocells, optionally perforated. These noise-reducing materials allow maintaining the sealing performance of traditional self-sealing systems, which are instead compromised in the case of conventional noise-reducing materials based on open-cell foamed polyurethanes.

U.S. Pat. No. 4,392,522 describes the reduction of noise caused by vehicle tires rolling on a road surface is by enclosing in the space confined by the tire and the wheel rim a noise or sound absorbing or insulating material which may assume various shapes. This noise absorbing or insulating material may be connected to the inner tire surface or to the rim surface facing into the tire. Thus, the material is not externally visible once the tire has been mounted on the wheel rim.

On the other hand, some acoustic absorber walls with perforations have been attached to the rim or tyre in order to reduce cavity noise.

For example, DE 10220193 describes that the noise generated by a pneumatic tire, when the motor vehicle is in motion is reduced by an acoustic absorber wall with micro-perforations which is clamped within the interior of a tubeless tire on a wheel rim. The wall is stabilized in use by the centrifugal forces of the rotating tire, which divides the space into acoustic inherent part-zones. The micro-perforations act as a broadband acoustic damper.

WO 2010/149364 relates to a sound absorber for bicycle wheels, comprising a rim on which a tire can be mounted, and characterized in that a micro-perforated structure and an absorption volume are integrated in the rim, or the rim itself can be partially micro-perforated, wherein a desired outer profile remains intact for mounting the tire, in which outer profile no raised areas are present that would complicate the mounting of the tire, except in edge regions of the rim US 2016/137010 relates to a pneumatic tire that includes a plate-like member which is attached to a tread portion inner surface by at least two attaching portions arranged with a space in a tire circumferential direction, and has a space with respect to the tread portion inner surface between the two adjacent attaching portions, wherein a through hole penetrating toward the space is formed in the plate-like member, and wherein a support member capable of supporting the plate-like member is arranged in the space.

The present invention has the object of at least partially overcoming the drawbacks in the prior art. In particular, the invention has the object of providing a tyre with improved noise-reduction capabilities.

This object is achieved by a pneumatic tyre as described herein, a wheel assembly as described herein and a method as described herein.

Advantageous embodiments are mentioned in the description and the dependent claims. They may be combined freely unless the context clearly indicates otherwise.

Accordingly, the invention is directed towards a pneumatic tyre comprising an inner surface of the tyre, wherein a sound absorbing device component is connected to the inner surface of the tyre. The sound absorbing device component comprises a panel with a plurality of perforations and two sidewall sections, the sidewall sections being distinct from the panel. The sidewall sections are connected to the inner surface of the tyre and arranged opposite of each other. The panel is borne by the sidewall sections, thereby positioning the panel at a distance from the inner surface of the tyre, defining an inner volume enclosed by the panel, the sidewall sections and the inner surface. Furthermore, ≥95 area-% (preferred ≥95 area-%, more preferred 100 area-%) of all perforations which permit access to the inner volume are located on the panel.

The invention is further directed towards a wheel assembly comprising a pneumatic tyre assembled onto a wheel, the pneumatic tyre comprising an inner surface of the tyre and the wheel comprising an inner surface of the wheel. The tyre is a tyre according to the invention and/or a sound absorbing device component is connected to the inner surface of the wheel. The sound absorbing device component comprises a panel with a plurality of perforations and two sidewall sections, wherein the sidewall sections are connected to the inner surface of the wheel and arranged opposite of each other. The panel is borne by the sidewall sections, thereby positioning the panel at a distance from the inner surface of the wheel, defining an inner volume enclosed by the panel, the sidewall sections and the inner surface. Furthermore, ≥95 area-% (preferred ≥95 area-%, more preferred 100 area-%) of all perforations which permit access to the inner volume are located on the panel.

Another aspect of the invention is a method of reducing noise emissions from a wheel assembly comprising a pneumatic tyre assembled onto a wheel, the pneumatic tyre comprising an inner surface of the tyre and the wheel comprising an inner surface of the wheel, wherein a sound absorbing device component is connected to the inner surface of the tyre and/or a sound absorbing device component is connected to the inner surface of the wheel. The sound absorbing device component comprises a panel with a plurality of perforations and two sidewall sections, wherein the sidewall sections are connected to the inner surface or the tyre or the inner surface of the wheel, respectively and are arranged opposite of each other. The panel is borne by the sidewall sections, thereby positioning the panel at a distance from the inner surface and defining an inner volume enclosed by the panel, the sidewall sections and the inner surface. Furthermore, ≥95 area-% (preferred ≥95 area-%, more preferred 100 area-%) of all perforations which permit access to the inner volume are located on the panel.

It has surprisingly been found that a sound absorbing component as outlined above is effective in reducing noise originating from tyres.

The present invention will be further described with reference to the following figures and examples without wishing to be limited by them.

Figure 1:
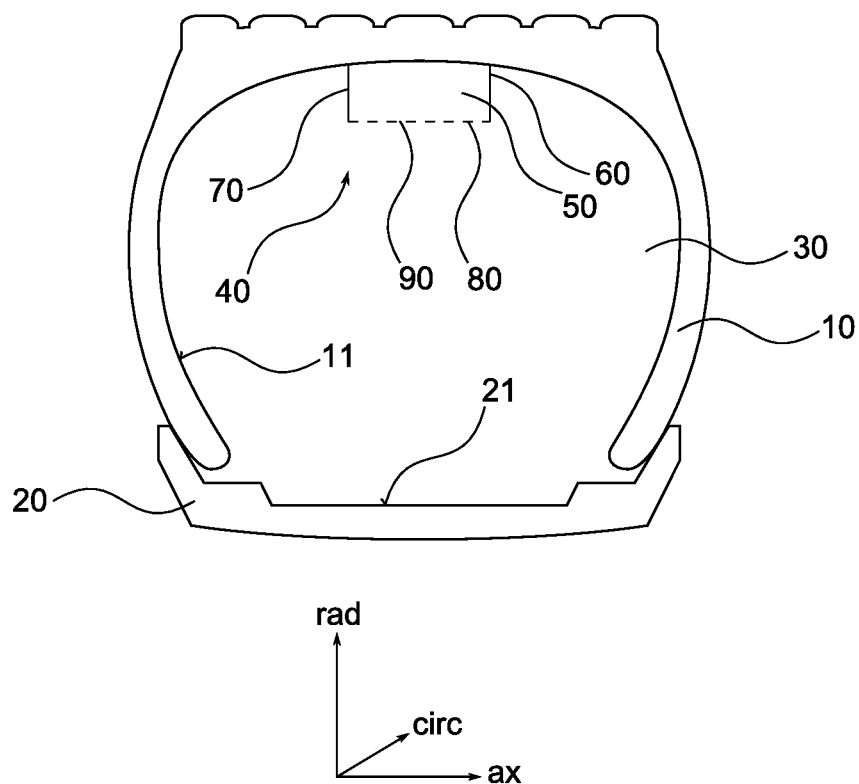
FIGS. 1 and 2 show wheel assemblies with tyres according to the invention

FIG. 1 schematically shows a cross-sectional view of a tyre according to the invention. The pneumatic tyre 10 is assembled onto a wheel 20. Therefore, FIG. 1 also schematically shows a cross-sectional view of a wheel/tyre assembly according to the invention. The coordinate system with its description of the axes (rad: radial direction of the tyre, ax: axial direction and circ: circumferential direction) are also used in connection with the other figures.

The pneumatic tyre 10 comprises an inner surface 11 of the tyre to which a sound absorbing device component 40 is attached. While the position of the sound absorbing device component 40 as shown in FIG. 1 is at the radially outermost section of the inner surface 11, the device 40 may also be positioned on other sections of the inner surface 11. For example, the device or devices 40 may be positioned at axially outermost and/or axially innermost sections of the inner surface 11.

The sound absorbing device component 40 comprises a panel 80 with a plurality of perforations 90 and two sidewall sections 60, 70. The sidewall sections 60, 70 are distinct from the panel 80: here, the sidewall sections 60, 70 are non-perforated, thereby forming a barrier between to inside 30 of the tyre 10. In general, the sidewall sections 60, 70 being distinct form the panel 80 is to be understood that they differ in at least one property, for example material, structure, geometrical dimensions, etc. from the panel.

As can be seen, the sidewall sections 60, 70 are connected to the inner surface 11 of the tyre 10 and are arranged opposite of each other. The panel 80 is borne by the sidewall sections 60, 70, thereby positioning the panel 80 at a distance from the inner surface 11 of the tyre 10 and defining an inner volume 50 enclosed by the panel 80, the sidewall sections 60, 70 and the inner surface 11.

The distance between opposing faces of the sidewall sections 60, 70 may, for example, be in a range of ≥10 mm to ≤160 mm, preferably ≥30 mm to ≤120 mm and more preferred ≥50 mm to ≤100 mm. It is preferred that the distance between opposing faces of the sidewall sections 60, 70 is as constant as possible, for example not deviating by more than ±10%, preferably not more than ±5% and more preferred by not more than ±2% from the average distance.

The distance between the inner surface 11 of the tyre 10 and the panel 80 may, for example, be in a range of ≥10 mm to ≤100 mm, preferably ≥20 mm to ≤70 mm and more preferred ≥30 mm to ≤60 mm. It is preferred that the distance between the inner surface 11 of the tyre 10 and the panel 80 is as constant as possible, for example not deviating by more than ±10%, preferably not more than ±5% and more preferred by not more than ±2% from the average distance.

In one embodiment of the tyre, also shown in FIG. 1, the sidewalls 60, 70 do not comprise perforations to the inner volume 50 of the sound absorbing device component. Then the only fluidic communication between the inside 30 of the tyre 10 and the inner volume 50 of the sound absorbing device component 40 may be via the perforations 90 of the panel 80.

In another embodiment of the tyre, also shown in FIG. 1, the inner volume 50 is void. Since fluidic communication between the inside 30 of the tyre 10 and the inner volume 50 of the sound absorbing device component 40 occurs via the perforations 90 of the panel 80, these volumes share the same contents. In most cases this will be the compressed air used to inflate the tyre.

Figure 2:
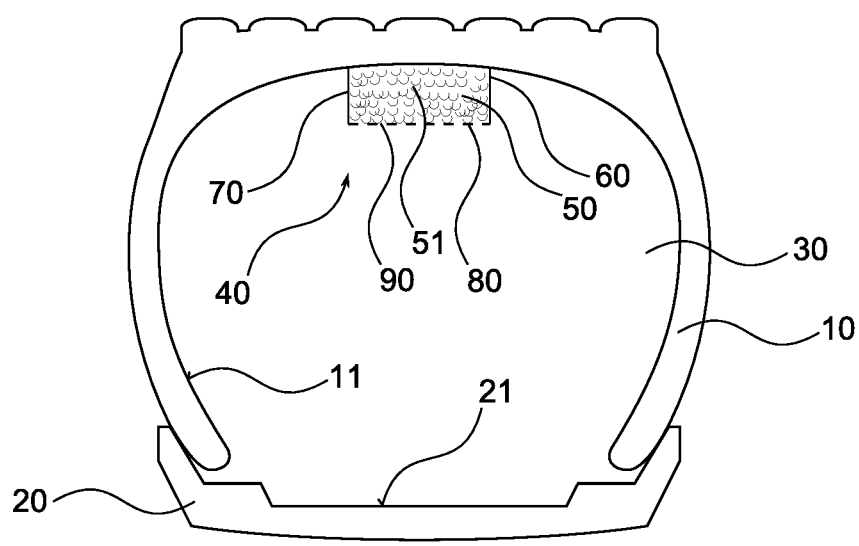

In another embodiment of the tyre, shown in FIG. 2, the inner volume 50 comprises a polymeric foam 51. Suitable densities may, for example, be in the range of ≥20 kg/m$^3$ to ≤80 kg/m$^3$. Examples for suitable foams include flexible polyurethane foams, rigid polyurethane foams and mechanically frothed latex foams. Preferably the foam 51 is an open-cell foam.

In another embodiment of the tyre the panel 80 comprises an elastomer and/or a metal. Suitable elastomers include natural rubbers, synthetic rubbers and polyurethane elastomers such as TPU and TPE. Suitable metals include aluminium, steel and copper.

In another embodiment of the tyre the panel 80 has a perforation ratio of ≥0.05% to ≤30% The perforation ratio is defined as ratio of area occupied by perforations to the total area, including perforations, of the panel. Preferably the perforation ratio is ≥0.1% to ≤1%, more preferred ≥0.1% to ≤0.3%.

In another embodiment of the tyre the perforations 90 in the panel 80 have a diameter of ≥0.5 mm to ≤20 mm preferably the diameter is ≥0.7 mm to ≤2 mm, more preferred ≥0.5 mm to ≤1.5 mm.

Figure 3:
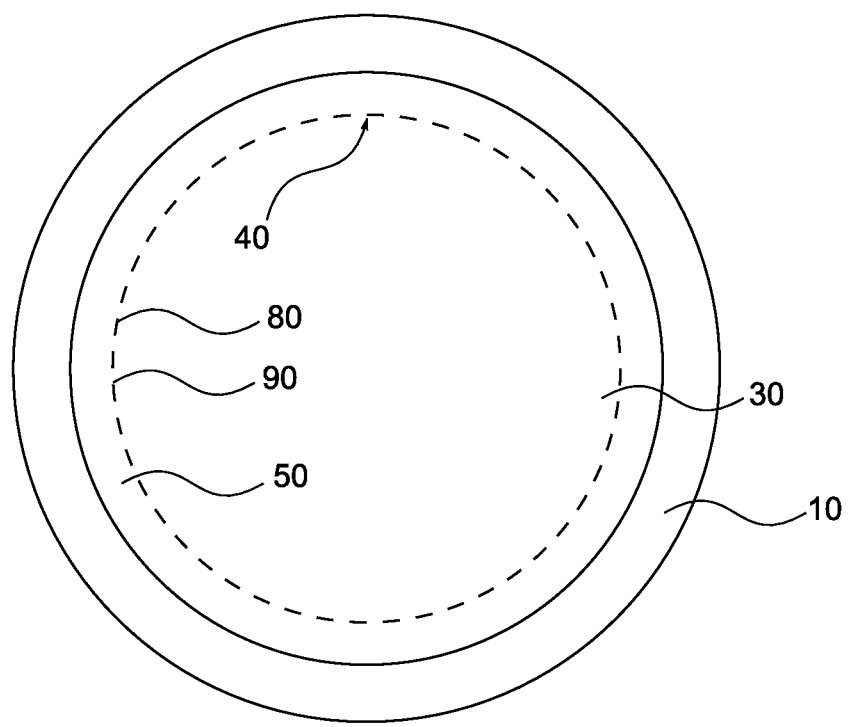
FIGS. 3 to 6 show tyres according to the invention
Figure 4:
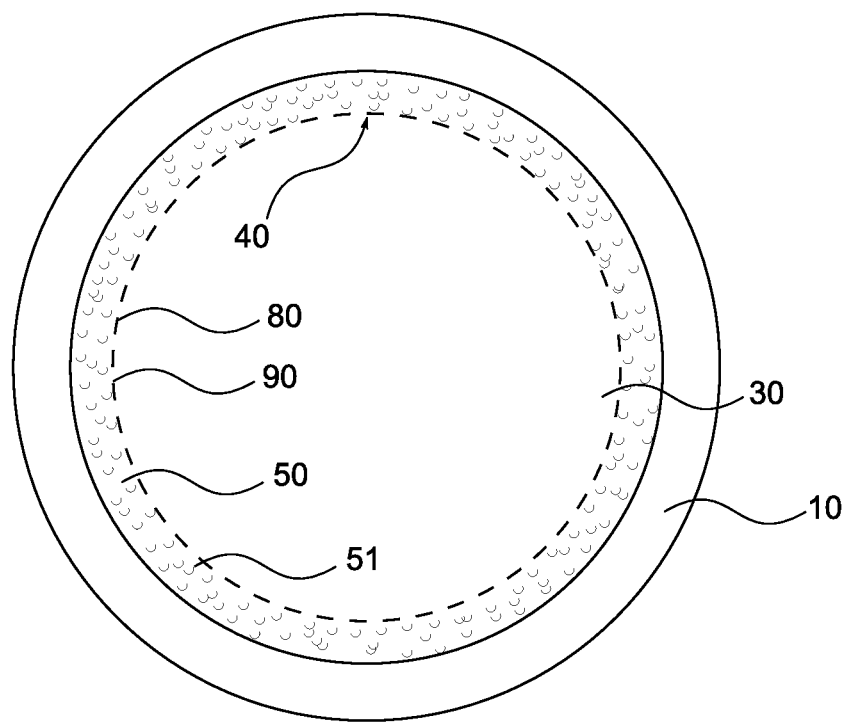

FIGS. 3 and 4 show cross-sections of a tyre according to the invention where, according to another embodiment of the tyre, the sound absorbing device component 40 extends along the entire inner circumference of the tyre 10. In FIG. 3 the inner volume 50 is void and in FIG. 4 it is filled with a polymeric foam 51. Preferably, this foam is an open-cell foam.

Furthermore, as the sound absorbing device component 40 extends along the entire inner circumference of the tyre, there are no perforations extending in circumferential direction to permit access to the inner volume 50 from the inside 30 of the tyre 10. If the the sidewalls (FIG. 1, reference numerals 60, 70) do not comprise perforations to the inner volume 50 of the sound absorbing device component 40 then 100 area-% of all perforations 90 (=all perforations 90) which permit access to the inner volume 50 are located on the panel 80. This is a preferred configuration.

Figure 5:
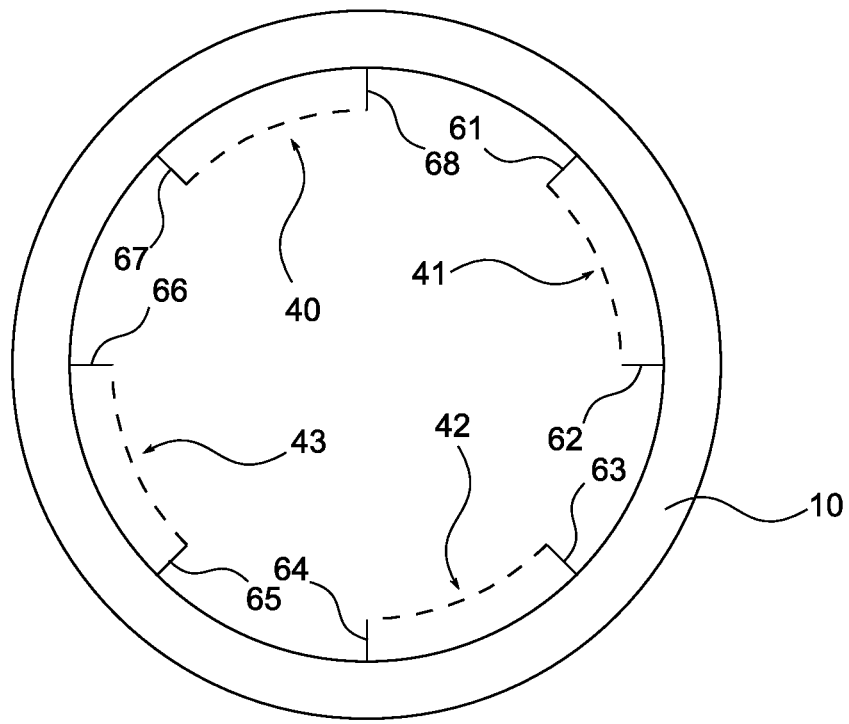
Figure 6:
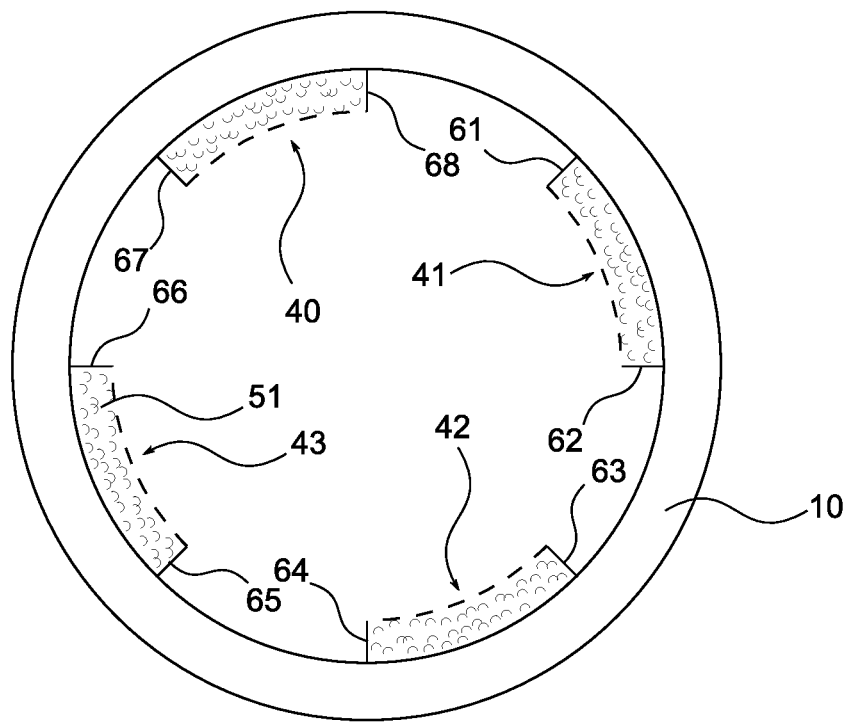

FIGS. 5 and 6 show cross-sections of a tyre according to the invention where, according to another embodiment of the tyre, a plurality of the sound absorbing device components 40, 41, 42, 43 is present and each sound absorbing device component 40, 41, 42, 43 extends along ≥10% to ≤25% of the entire inner circumference of the tyre 10. Preferably, this extension is ≥12.5% to ≤20%. Regarding the number of individual sound absorbing device components, it is preferred that the tyre comprises 2, 3, 4, 5, 6, 7, 8, 9 or 10 individual sound absorbing device components. In FIG. 5, the tyre comprises four sound absorbing device components, each extending along 12.5% of the entire inner circumference of the tyre and evenly spaced apart from each other. In FIG. 5 the inner volume of the sound absorbing device components is void and in FIG. 6 it is filled with a polymeric foam 51. Preferably, this foam is an open-cell foam.

The individual sound absorbing device components 40-43 are delimited in circumferential direction of the tyre by frontal walls 61-68. If these frontal walls 61-68 do not comprise perforations to the inner volume 50 of the sound absorbing device component 40 then 100 area-% of all perforations 90 (=all perforations 90) which permit access to the inner volume 50 are located on the panel 80. This is a preferred configuration.

Figure 7:
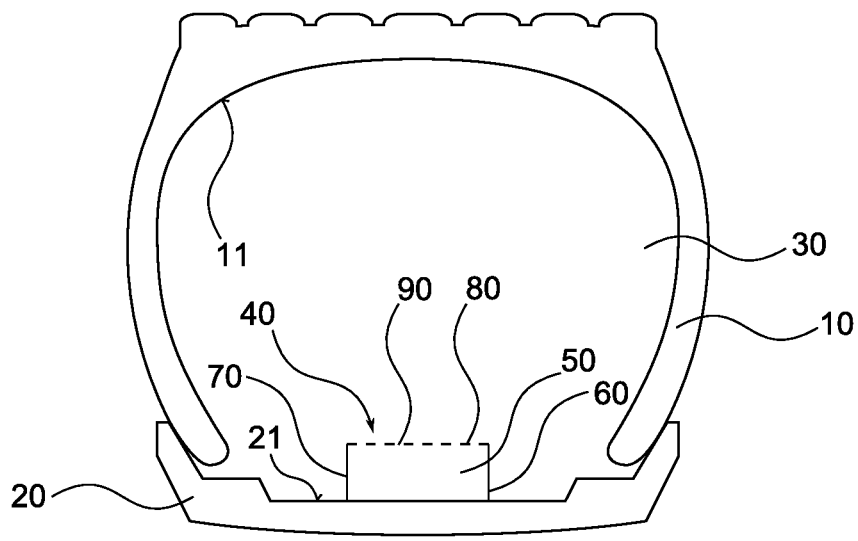
FIG. 7 shows a tyre/wheel assembly according to the invention

FIG. 7 schematically shows a cross-sectional view of a tyre/wheel assembly according to the invention. The assembly comprises pneumatic tyre 10 assembled onto wheel 20. The wheel 20 comprises an inner surface 21 of the wheel and a sound absorbing device component 40 as already described above is connected to the inner surface 21 of the wheel 20.

Embodiments relating to the sound absorbing device component 40 in the tyre/wheel assembly according to the invention correspond to those in connection with the tyre as outlined above:

In one embodiment of the tyre/wheel assembly, in the sound absorbing device component 40 the sidewalls 60, 70 do not comprise perforations to the inner volume 50 of the sound absorbing device component. Then the only fluidic communication between the inside 30 of the tyre 10 and the inner volume 50 of the sound absorbing device component 40 is via the perforations 90 of the panel 80.

In another embodiment of the tyre/wheel assembly, in the sound absorbing device component 40 the inner volume 50 is void. Since fluidic communication between the inside 30 of the tyre 10 and the inner volume 50 of the sound absorbing device component 40 occurs via the perforations 90 of the panel 80, these volumes share the same contents. In most cases this will be the compressed air used to inflate the tyre.

In another embodiment of the tyre/wheel assembly, in the sound absorbing device component 40 the inner volume 50 comprises a polymeric foam 51. Examples for suitable foams include flexible polyurethane foams, rigid polyurethane foams and mechanically frothed latex foams. Preferably the foam 51 is an open-cell foam.

In another embodiment of the tyre/wheel assembly, in the sound absorbing device component 40 the panel 80 comprises an elastomer and/or a metal. Suitable elastomers include natural rubbers, synthetic rubbers and polyurethane elastomers such as TPU and TPE. Suitable metals include aluminium, steel and copper.

In another embodiment of the tyre/wheel assembly, in the sound absorbing device component 40 the panel 80 has a perforation ratio of ≥0.05% to ≤30% The perforation ratio is defined as ratio of area occupied by perforations to the total area, including perforations, of the panel. Preferably the perforation ratio is ≥0.1% to ≤1%, more preferred ≥0.1% to ≤0.3%.

In another embodiment of the tyre/wheel assembly, in the sound absorbing device component 40 the perforations 90 in the panel 80 have a diameter of ≥0.5 mm to ≤20 mm preferably the diameter is ≥0.7 mm to ≤2 mm, more preferred ≥0.7 mm to ≤1.5 mm.

In another embodiment of the tyre/wheel assembly, the sound absorbing device component 40 extends along the entire inner circumference of the wheel 20.

In another embodiment of the tyre/wheel assembly a plurality of the sound absorbing device components 40, 41, 42, 43 is present and each sound absorbing device component 40, 41, 42, 43 extends along ≥10% to ≤25% of the entire inner circumference of the wheel 20. Preferably, this extension is ≥12.5% to ≤20%. Regarding the number of individual sound absorbing device components, it is preferred that the tyre comprises 2, 3, 4, 5, 6, 7, 8, 9 or 10 individual sound absorbing device components.

EXAMPLES

I. Impedance Tube Testing

Several sound absorbing devices were tested in an impedance tube. The impedance tube was developed to measure dissipation losses of a sample inside the tube. At the front of the tube a speaker was placed which generates propagating sound waves in a frequency sweep. In the middle part of the tube a sample can be placed. Finally, the amount of sound energy dissipation has been determined by measuring the sound energy of the sound wave before and after a sample.

Four samples were tested ("MPP": multi-perforated panel):
1. Only foam (comparative example)
2. MPP (diameter holes of 1.4 mm, perforation ratio of 0.26%, thickness of aluminium perforated plate: 2 mm) supported on two sides with wooden blocks (50 mm height, comparative example: "open compartment")
3. The same MPP as in sample 2, now supported by a wooden box of 50 mm height, the MPP forming the top face of the wooden box (inventive example: "closed compartment")
4. The same MPP as in sample 3, however the wooden box was filled with an open-cell polyurethane flexible foam having a density of 57 kg/m$^3$ (inventive example: "closed compartment and foam backing")

Figure 8:
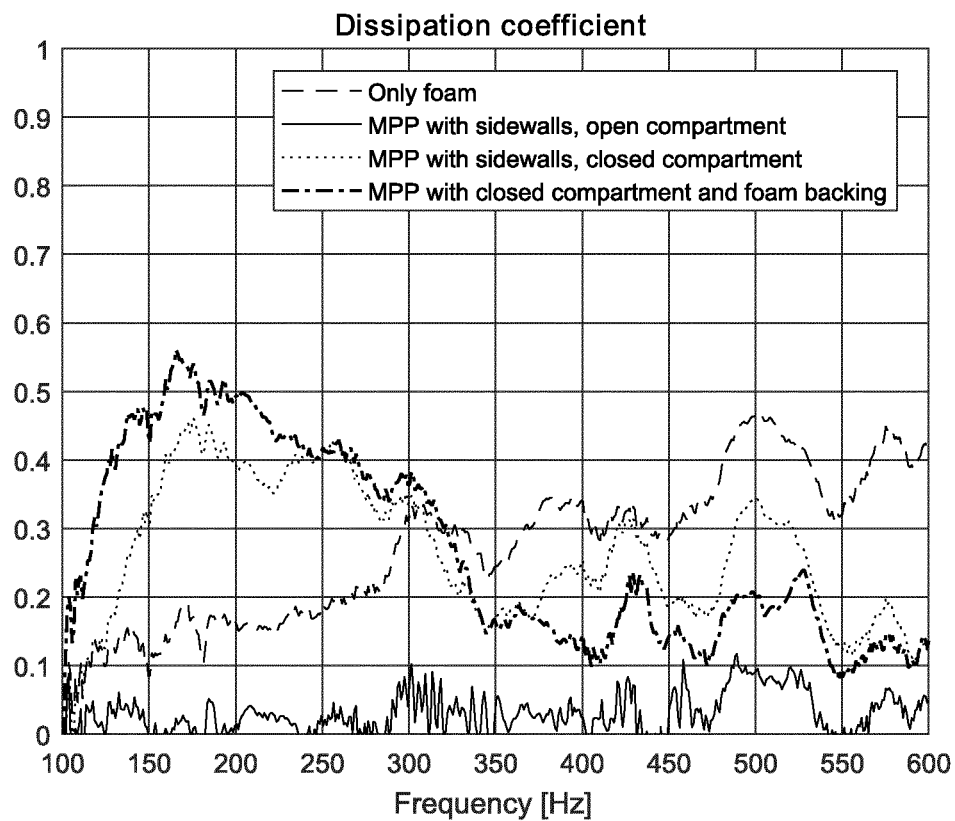
FIGS. 8 and 9 show experimental data

The results are depicted in FIG. 8.

II. Tyre Prototype Testing

Prototypes of tyres equipped with sound absorbing devices were compared to a reference tyre. Prototypes with MPP-type sound absorbing devices were applied to the inner-liner of a 245/45R18 Vredestein Ultrac Vorti tyre. These tyres were tested on a test machine with a rotating drum. Both a coast-down of 145-20 km/h and three constant speed measurements (120, 80 and 60 km/h) were carried out. Vibrations were measured at the hub with an accelerometer.

Figure 9:
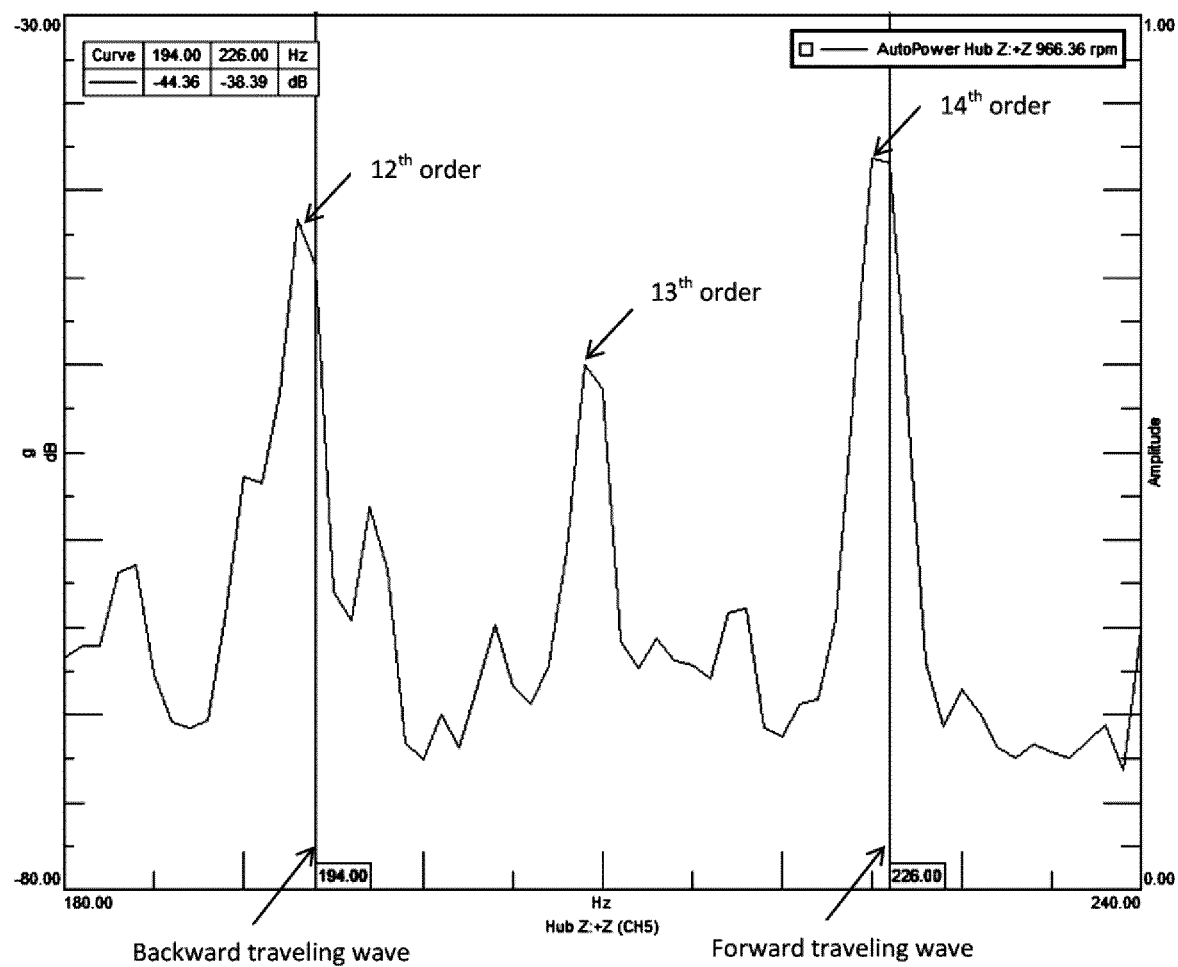

Results at constant speeds of 60 and 120 km/h were used for comparison purposes, as at these speeds skew orders are amplified by the backward or forward traveling wave of the first cavity resonance mode as depicted for 120 km/h in FIG. 9. It can be seen that at 120 km/h the forward- and backward traveling wave intersect with the 12th and 14th order coming from the tyre tread blocks. The results and details of the comparative examples C1, and C2, as well as the inventive example 11410 are given in the table below.

|   | Panel properties | | | | Compartment properties | | | Sidewall | No. of sound | Relative length of | |
|---|---|---|---|---|---|---|---|---|---|---|---|
|   | Hole | Perforation | | | | | | | | | |
| Example | Diameter d (mm) | ratio p (%) | Thickness h (mm) | Material | Height (mm) | Density (kg/m³) | Material | section material | absorbing devices | device (%) | Avg. RMS |
| C1 | — | — | — | — | — | — | — | — | — | — | 0 |
| C2 | — | — | — | — | 50 | 20 | PU | — | 4 | 12.5% | 1.2 |
| I1 | 1.4 | 0.26 | 1 | BR | 50 | 20 | PU | RS | 4 | 12.5% | 0.1 |
| I2 | 1.4 | 0.26 | 1 | BR | 50 | 20 | PU | CC | 4 | 12.5% | −0.7 |
| I3 | 2 | 0.16 | 2 | BR | 30 | 20 | PU | PU | 4 | 12.5% | −2.1 |
| I4 | 1.4 | 0.26 | 1 | BR | 30 | 20 | PU | RS | 4 | 12.5% | −2.2 |
| I5 | 2 | 0.16 | 1 | P | 50 | 20 | PU | RS | 4 | 12.5% | −2.8 |
| I6 | 1.4 | 0.26 | 2 | BR | 50 | 20 | PU | RS | 4 | 12.5% | −3.1 |
| I7 | 15 | 28 | 2 | BR | 30 | 20 | PU | RS | 4 | 12.5% | −3.3 |
| I8 | 1 | 0.16 | 2 | P | 30 | 20 | PU | RS | 4 | 12.5% | −5.1 |
| I9 | 1 | 0.16 | 1 | BR | 30 | 20 | PU | RS | 1 | 100% | −7.2 |
| I10 | 1.4 | 0.26 | 1 | BR | 50 | 1.2* | air | CC | 4 | 12.5% | −0.5 |

Panel material: BR = butyl rubber; P = polyurethane elastomer
Compartment material: PU = open-cell polyurethane flexible foam having a density of 57 kg/m³
Sidewall section material: RS = rubber seal; CC = closed cell foam
*I10 contains an air instead of foam
The negative RMS values demonstrate the sound absorbing effect of the devices according to the invention.

The invention claimed is:

1. A pneumatic tyre comprising an inner surface of the tyre,
    wherein a sound absorbing device component is connected to the inner surface of the tyre,
    wherein the sound absorbing device component comprises a panel with a plurality of perforations and two sidewall sections, the sidewall sections being distinct from the panel,
    wherein the sidewall sections are connected to the inner surface of the tyre and arranged opposite of each other,
    wherein the panel is borne at least by the sidewall sections, thereby positioning the panel at a distance from the inner surface of the tyre and defining an inner volume enclosed by the panel, the sidewall sections and the inner surface,
    wherein ≥95 area-% of all perforations which permit access to the inner volume are located on the panel, and
    wherein the inner volume comprises a polymeric foam, and
    wherein the sound absorbing device component and the polymeric foam extend along the entire inner circumference of the tyre.

2. The tyre according to claim 1, wherein the sidewalls do not comprise perforations to the inner volume of the sound absorbing device component.

3. The tyre according to claim 1, wherein the foam is an open-cell foam.

4. The tyre according to claim 1, wherein the panel comprises an elastomer and/or a metal.

5. The tyre according to claim 1, wherein the panel has a perforation ratio of ≥0.05% to ≤30%.

6. The tyre according to claim 1, wherein the perforations in the panel have a diameter of ≥0.5 mm to ≤20 mm.

7. A wheel assembly comprising a pneumatic tyre assembled onto a wheel,
    the pneumatic tyre comprising an inner surface of the tyre and the wheel comprising an inner surface of the wheel,
    wherein
    the tyre is a tyre according to claim 1.

8. The wheel assembly according to claim 7, wherein the sidewalls do not comprise perforations to the inner volume of the sound absorbing device component.

9. The wheel assembly according to claim 7, wherein the inner volume comprises an open-cell polymeric foam.

10. A method of reducing noise emissions from a wheel assembly comprising a pneumatic tyre assembled onto a wheel, the pneumatic tyre comprising an inner surface of the tyre and the wheel comprising an inner surface of the wheel, the method comprising: connecting a sound absorbing device component to the inner surface of the tyre and/or connecting a sound absorbing device component to the inner surface of the wheel, wherein the sound absorbing device component comprises a panel with a plurality of perforations and two sidewall sections, wherein the sidewall sections are connected to the inner surface of the tyre or the inner surface of the wheel, respectively, and are arranged opposite of each other, wherein the panel is borne by the sidewall sections, thereby positioning the panel at a distance from the inner surface of the tyre or the inner surface of the wheel, respectively, and defining an inner volume enclosed by the panel, the sidewall sections and the inner surface of the tyre or the inner surface of the wheel, respectively, wherein 95 area-% of all perforations which permit access to the inner volume are located on the panel, and wherein the inner volume comprises a polymeric foam, and wherein the sound absorbing device component and the polymeric foam extend along the entire inner circumference of the tyre or the entire inner circumference of the wheel, respectively.

11. A wheel assembly comprising a pneumatic tyre assembled onto a wheel, the pneumatic tyre comprising an inner surface of the tyre and the wheel comprising an inner surface of the wheel, wherein a sound absorbing device component is connected to the inner surface of the wheel, wherein the sound absorbing device component comprises a panel with a plurality of perforations and two sidewall sections, wherein the sidewall sections are connected to the inner surface of the wheel and arranged opposite of each other, wherein the panel is borne by the sidewall sections, thereby positioning the panel at a distance from the inner surface of the wheel and defining an inner volume enclosed by the panel, the sidewall sections and the inner surface of the wheel, wherein 95 area-% of all perforations which permit access to the inner volume are located on the panel, and wherein the inner volume comprises a polymeric foam, and wherein the sound absorbing device component and the polymeric foam extend along the entire inner circumference of the wheel.

12. The wheel assembly according to claim 11, wherein the sidewalls do not comprise perforations to the inner volume of the sound absorbing device component.

13. The wheel assembly according to claim 11, wherein the inner volume comprises an open-cell polymeric foam.

* * * * *